(12) United States Patent
Sobhy Deraz et al.

(10) Patent No.: US 10,140,280 B2
(45) Date of Patent: Nov. 27, 2018

(54) ASYNCHRONOUS DYNAMIC FUNCTIONS FOR CALCULATION ENGINES

(71) Applicant: Microsoft Technology Licensing, LLC, Redmond, WA (US)

(72) Inventors: Ehab Sobhy Deraz, Bellevue, WA (US); Thomas Alexander Morrison, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/451,952

(22) Filed: Mar. 7, 2017

(65) Prior Publication Data

US 2018/0260374 A1 Sep. 13, 2018

(51) Int. Cl.
  *G06F 17/20* (2006.01)
  *G06F 17/24* (2006.01)
  *H04L 29/08* (2006.01)
  *G06F 17/11* (2006.01)

(52) U.S. Cl.
  CPC .......... *G06F 17/246* (2013.01); *G06F 17/11* (2013.01); *H04L 67/10* (2013.01)

(58) Field of Classification Search
  CPC ......... G06F 17/246; G06F 17/11; H04L 67/10
  USPC ....................................................... 715/219
  See application file for complete search history.

(56) References Cited

U.S. PATENT DOCUMENTS

| | | | |
|---|---|---|---|
| 8,108,339 B2 * | 1/2012 | Bezar | G06F 17/30581 707/610 |
| 8,584,004 B2 | 11/2013 | Rae et al. | |
| 9,053,083 B2 | 6/2015 | Waldman et al. | |
| 9,075,787 B2 * | 7/2015 | Schodl | G06F 17/246 |
| 9,389,891 B2 | 7/2016 | Battagin et al. | |
| 9,465,787 B2 | 10/2016 | Kjaer | |
| 2011/0016379 A1 | 1/2011 | Mccoll et al. | |
| 2011/0191665 A1 | 8/2011 | Handsaker et al. | |
| 2012/0192055 A1 | 7/2012 | Antebi et al. | |

(Continued)

OTHER PUBLICATIONS

Deskbright, "Excel Nested Functions", as published on Nov. 20, 2015, obtained via the Internet Archive Wayback Machine located at https://web.archive.org/web/20151120012823/http://www.deskbright.com:80/excel/excel-nested-functions/, pp. 1-2.*

(Continued)

*Primary Examiner* — Keith D Bloomquist (57) ABSTRACT

Systems, methods, and software for data calculation frameworks for user applications are provided herein. An exemplary method includes providing functions for use by a calculation engine of the user application, determining that the calculation engine issues a call for evaluation of a nested expression comprising at least a child function embedded in a parent function, and responsively dispatching at least a first evaluation process for a first portion of the nested expression that employs the child function. During evaluation of the nested expression, the method includes indicating to the calculation engine a predetermined result for at least the parent function, and dispatching at least a second evaluation process for a second portion of the nested expression that employs the child result. Responsive to receiving a parent result from the second evaluation process, the method includes indicating the parent result to the calculation engine.

18 Claims, 5 Drawing Sheets

(56) References Cited

U.S. PATENT DOCUMENTS

| | | | |
|---|---|---|---|
| 2013/0159832 | A1 | 6/2013 | Ingargiola et al. |
| 2014/0136937 | A1 | 5/2014 | Patel et al. |
| 2014/0195466 | A1 | 7/2014 | Phillipps et al. |
| 2015/0309980 | A1* | 10/2015 | Glass ............... G06F 9/543 715/219 |

OTHER PUBLICATIONS

"Custom Functions in Google Sheets", https://developers.google.com/apps-script/guides/sheets/functions, Published on: Feb. 22, 2016, 5 pages.

Shalom, et al., "High-Performance Excel-Based Applications in Financial Services", https://msdn.microsoft.com/en-us/library/bb887539.aspx, Published on: Aug. 2007, 13 pages.

Wil Conway, "How to Create Custom Functions in Google Sheets", http://www.makeuseof.com/tag/create-custom-functions-google-sheets/, Published on: Apr. 4, 2016, 10 pages.

"XLLoop Excel User-Defined Functions in Java, Javascript, Ruby, Python, Erlang", https://web.archive.org/web/20100909224326/http://xlloop.sourceforge.net/, Published on: Sep. 9, 2010, 6 pages.

"Get an Office Add-in for Excel", https://support.office.com/en-us/article/Get-an-Office-Add-in-for-Excel-d3df5854-0a4e-4169-9cc3-25177a288d3d, Retrieved on: Dec. 13, 2016, 6 pages.

"Work with external data in Excel Services (SharePoint Server)", https://support.office.com/en-us/article/Work-with-external-data-in-Excel-Services-SharePoint-%20Server-a00e5a66-017e-4956-bd40-49639ad1f1d0?CTT=1&CorrelationId=92c34daf-9edf-4583-9593-53f0b9d3a489&ui=en-US&rs=en-US&ad=US&ocmsassetID=HA102830785, Retrieved on: Dec. 13, 2016, 6 pages.

Hernandez, Luis, "4 Ways to Automagically Get Your Data Into Spreadsheets", https://www.geckoboard.com/blog/4-ways-to-automagically-get-your-data-into-spreadsheets/, Published on: Feb. 23, 2016, 12 pages.

Arndt, Tamsen, "Using Google Sheets' Importxml Function to Display Data in Geckoboard", https://support.geckoboard.com/hc/en-us/articles/207238327-Using-the-Google-Sheets-ImportXML-function-to-display-data-in-Geckoboard?_ga=1.134002126.1792080127.1481626866, Published on: Sep. 21, 2016, 12 pages.

"Connect to (import) external data", https://support.office.com/en-us/article/Connect-to-import-external-data-1376a390-a8bd-4718-aeb5-dff2ae88e92d, Retrieved on: Dec. 13, 2016, 4 pages.

Quinn, Thomas, "Super Powers for Excel—Offloading Excel Calculations to a Cluster or the Cloud", https://blogs.technet.microsoft.com/hpc_and_azure_observations_and_hints/2012/05/04/super-powers-for-excel-offloading-excel-calculations-to-a-cluster-or-the-cloud, Published on: May 4, 2012, 6 pages.

"Formula Evaluation", https://poi.apache.org/spreadsheet/eval.html, Published on: 2002, 4 pages.

Balson, et al., "User Defined Spreadsheet Functions in Excel", In Proceedings of European Spreadsheet Risks Interest Group Conference, Nov. 28, 2012, pp. 1-11.

Treacy, Philip, "Creating a UDF (User Defined Function) in Excel", http://www.myonlinetraininghub.com/creating-a-udf-user-defined-function-in-excel, Published on: Sep. 15, 2016, 20 pages.

"Excel Recalculation", https://msdn.microsoft.com/en-us/library/office/bb687891.aspx, Published on: Jul. 1, 2011, 6 pages.

* cited by examiner

ASYNCHRONOUS DYNAMIC FUNCTIONS FOR CALCULATION ENGINES

BACKGROUND

Various user productivity applications allow for data entry and analysis. These applications can provide for data creation, editing, and analysis using spreadsheets, presentations, documents, messaging, or other user activities. Users can employ both user defined functions and predefined functions to evaluate data entered into the user applications. For example, a spreadsheet user might enter data into cells for which the user desires to evaluate using one or more expressions. These expressions can include formulae, parameters, data, or other elements that are used to return a result to the user based on evaluation by one or more functions.

However, the number of functions for data evaluation that are available to a user might be limited by storage constraints or computing constraints associated with the devices on which the user applications are deployed. Moreover, the user might desire to employ functions that are located remotely from the device or platform on which the user application is deployed. In can be difficult to incorporate these additional or remote functions in user applications due to the changing nature of the data and functions and possible unavailability of the functions when the user platform is disconnected or otherwise unable to receive immediate expression evaluation for user data.

OVERVIEW

Systems, methods, and software for data calculation frameworks for user applications are provided herein. An exemplary method includes providing functions for use by a calculation engine of the user application, determining that the calculation engine issues a call for evaluation of a nested expression comprising at least a child function embedded in a parent function, and responsively dispatching at least a first evaluation process for a first portion of the nested expression that employs the child function. During evaluation of the nested expression, the method includes indicating to the calculation engine a predetermined result for at least the parent function, and dispatching at least a second evaluation process for a second portion of the nested expression that employs the child result. Responsive to receiving a parent result from the second evaluation process, the method includes indicating the parent result to the calculation engine.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

User productivity applications provide for user data creation, editing, and analysis using spreadsheets, slides, documents, messaging, or other application data formats and types. In many user applications, data analysis can include various calculations or expression evaluation performed on the data using various functions. These functions can be user defined or application-provided, such as mathematical functions, data alteration functions, data analysis functions, or others. The functions might be provided locally on a device on which the user application is executed. However, in the examples herein, many functions can be provided that are remotely handled from the user devices, and might be included on distributed computing or 'cloud' computing platforms. These platforms may or may not be available to a user at any particular time, and thus the examples herein provided several examples on how to provide non-local data functions to users.

In one example application, such as a spreadsheet application, data can be entered into cells that are arranged into columns and rows. Each cell can contain user data and can also include one or more expressions that are used to perform calculations or other functions on the data, which can reference user-entered data in one or more other cells. Other user applications can also include expressions for evaluation of user data, even if these other applications include other data entry elements than cells and the like.

The examples herein discuss frameworks for at least spreadsheet applications that provide efficient addition, modification, and removal of functions at runtime. Some spreadsheet applications, such as Microsoft® Excel, can include "XLL" files that comprise add-in files are similar to a dynamic linked library (DLL) file except built specifically for Microsoft Excel, and visual basic application (VBA) extensions. However, these XLL and VBA add-ins still lack dynamic loading, dynamic handling, and are typically limited to desktop application environments.

The examples herein include frameworks that allow application developers and users to quickly implement new functions in a standardized way. Some of these functions include machine learning functions provided by distributed computing platforms which can be dynamically provided for users to handle data calculation and expression evaluation within user applications.

The frameworks discussed herein include dynamic user defined functions, which are referred to herein as dynamic functions or DynamicUDFs. These dynamic functions or DynamicUDFs can be provided to users that interact with applications through a user interface. A dynamic function interface can be provided that interfaces a calculation engine or platform of the user application with a dynamic function handler platform. The dynamic function interface can include object-oriented programming 'methods' to access information about the function(s), such as names, descriptions, and arguments. Moreover, the dynamic function interface can be employed to compute results without blocking current operations of the user application or the calculation engine associated therewith. For example, non-blocking operations provided by the dynamic function interface can be used to make web requests or out-of-process calls, which might otherwise be I/O blocking. Rather than hang processing threads associated with the user interface or calculation engine, the examples herein allow a user to continue using the application. Results from the DynamicUDFs can be provided asynchronously. Synchronous operation can also be provided in certain functions that are volatile, such as random number generation. These might still be executed in a synchronous manner to ensure consistency and maintain state for nested operations that employ certain volatile functions. A user or a function itself can indicate if asynchronously or synchronously operation is desired.

Figure 1:
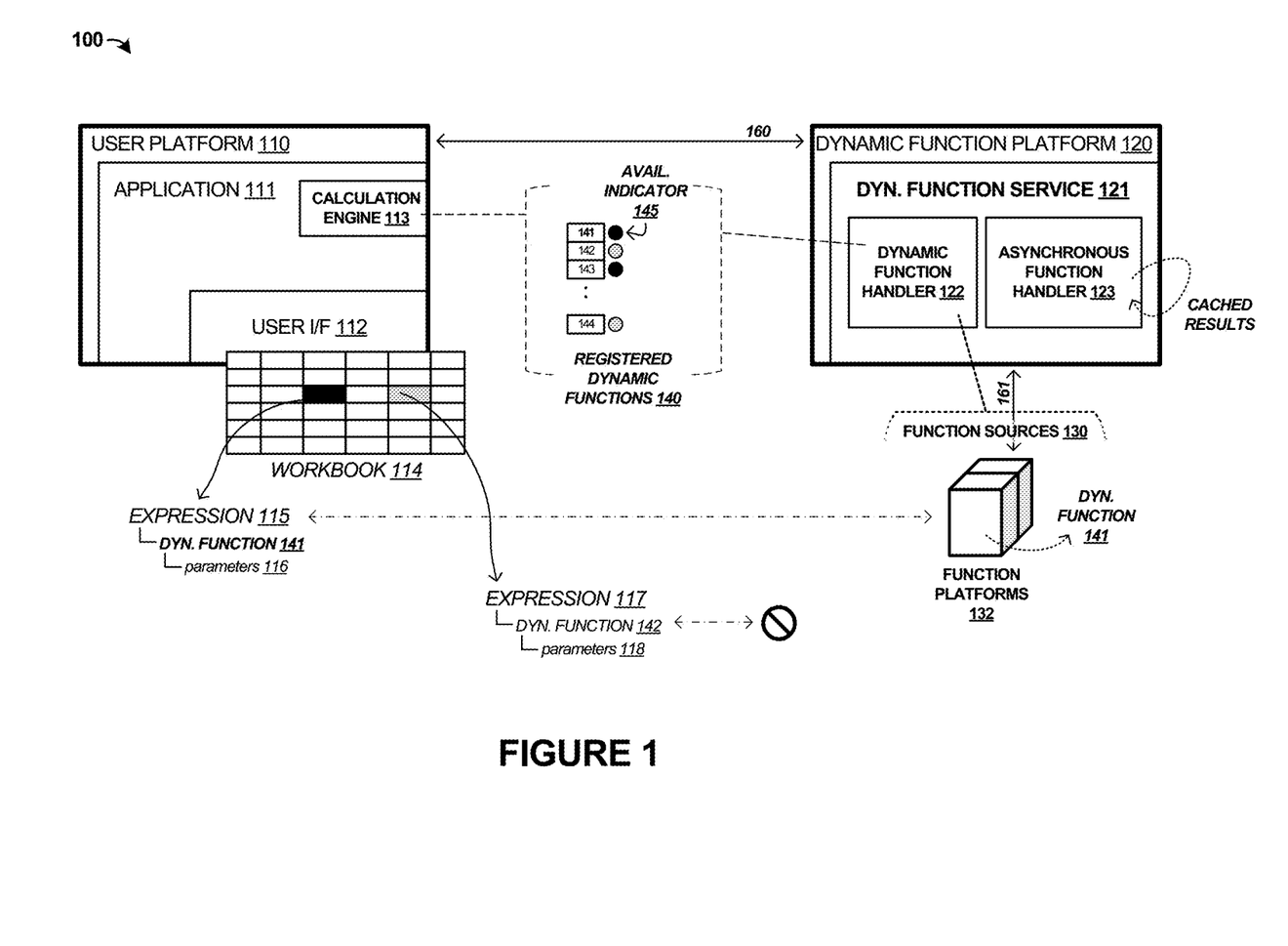
FIG. 1 illustrates a data calculation environment in an example.

As a first example of a calculation framework for a user application, FIG. 1 is provided. FIG. 1 illustrates data calculation environment 100 in an example. Environment 100 includes user platform 110, dynamic function platform 120, and function sources 130. The elements of FIG. 1 can communicate over one or more physical or logical communication links. In FIG. 1, links 160-161 are shown. However, it should be understood that these links are only exemplary and one or more further links can be included, which might include wireless, wired, optical, or logical portions.

In operation, user platform 110 provides an application platform for a user to interact with elements of user application 111 via user interface 112. During user interaction with application 111, data manipulation and data calculation might be performed. Calculation engine 113 can provide portions of the functionality for data calculation and expression evaluation within application 111. Calculation engine 113 might be separate from or integrated into application 111, and in some examples, can be shared among multiple applications. Calculation engine 113 can provide for evaluation of expressions using one or more functions that provide results based on parameters and data provided by users and application 111.

Dynamic functions are provided in FIG. 1 and provided by dynamic function service 121 of dynamic function platform 120. Dynamic functions comprise functions that can be provided for use by calculation engine 113 in a dynamic fashion. These dynamic functions can be registered for use by calculation engine 113, but the dynamic functions might not be always available and 'local' for processing data or evaluation of expressions by calculation engine 113. In some examples, the dynamic functions can be handled asynchronously, and nested or recursive dynamic functions can also be handled appropriately by dynamic function service 121. Function sources 130 can provide platforms for one or more dynamic functions. Function sources 130 can comprise servers, services remote from user platform 110, distributed computing platforms, distributed storage platforms, 'cloud' computing platforms, or other platforms and system which are typically non-local to user platform 110. These platforms can be coupled to dynamic function platform 120 over one or more packet networks or packet links, such as link 161, among others.

Figure 2:
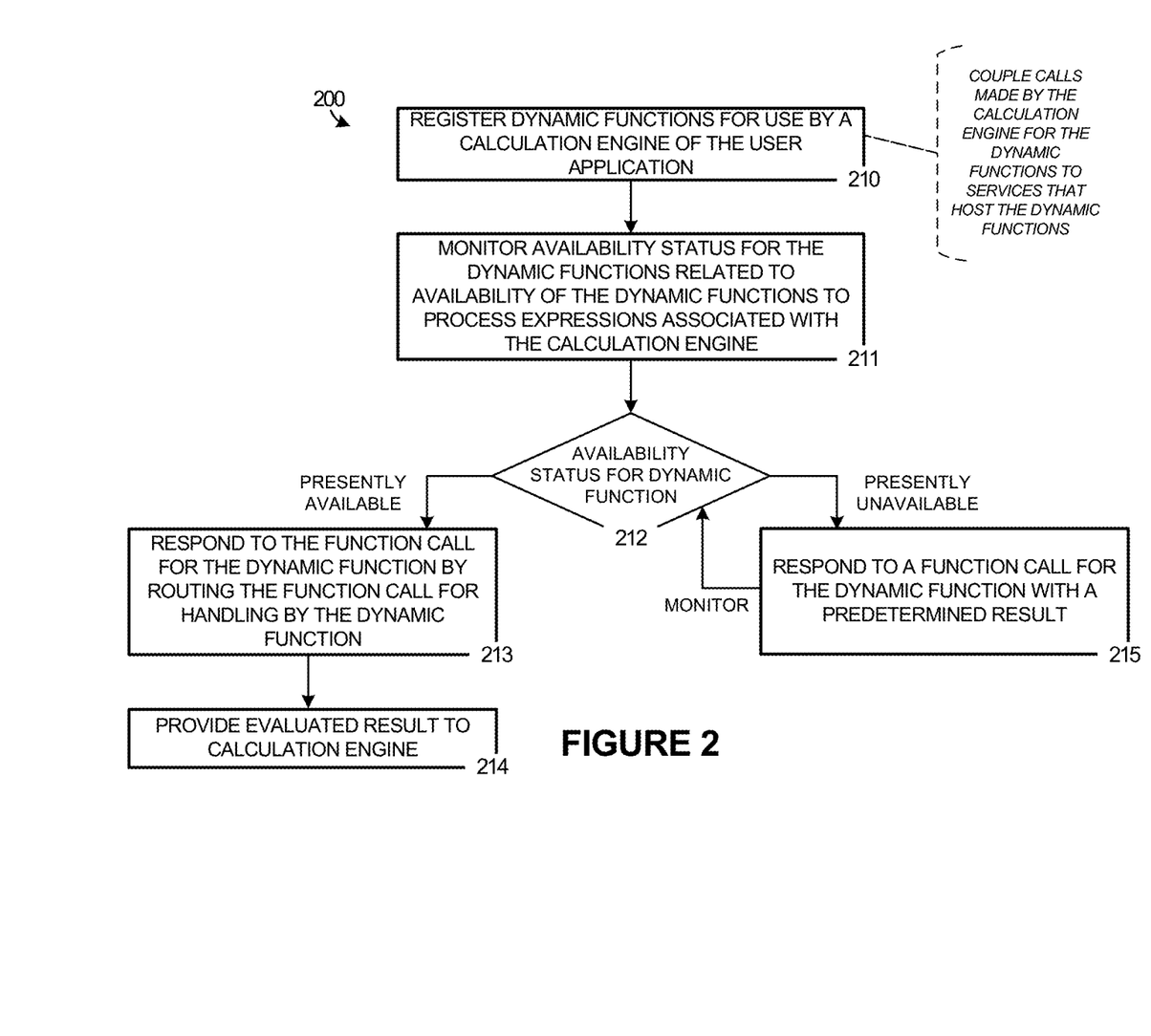
FIG. 2 illustrates operations of data calculation environments in an example.

For a further discussion of the operation of environment 100, FIG. 2 is presented. FIG. 2 is a flow diagram illustrating example operation of elements of environment 100. In operation 210, dynamic function service 121 registers dynamic functions for use by calculation engine 113 of user application 111. In FIG. 1, dynamic function service 121 includes dynamic function handler 122 which can register the dynamic functions for use by calculation engine 113. The registration process can comprise making available the dynamic functions in a data structure or list, or through indications of available function calls. In FIG. 1, registered dynamic functions 140 are shown as including functions 141-144. As a part of the registration of the dynamic functions, dynamic function handler 122 couples calls made by calculation engine 113 for the dynamic functions to services that host the dynamic functions. These services include function sources 130 that comprise function platforms 132.

In operation 211, dynamic function service 121 monitors availability status for the dynamic functions related to a present capability of each of the dynamic functions to process expressions associated with the calculation engine. In FIG. 1, registered dynamic functions 140 are shown as including functions 141-144, each with an associated availability indicator 145. This availability indicator can inform calculation engine 113 when each of the functions are presently available based in part on a status of function sources 130 or function platforms 132 on which the dynamic functions can reside. The availability status can be indicated to users in application 111, such as using flags, color indicators, messages, pop-up information, or other indicators.

Calculation engine 113 can issue one or more function calls during evaluation processes for expressions included in application 111. These function calls can be issued responsive to various triggers, such as completion of user data/expression entry, a user interface element that can trigger evaluation of an expression, or other factors, including refresh commands, initial loading of user data or user data files. In the spreadsheet example of FIG. 1, users can enter data, formulae, parameters, mathematical expressions, logical expressions, function calls, and other information into individual cells. In other examples, the cells can be auto-filled with expressions or other information that refers to one or more functions. In this example, two cells include expressions with functions, namely a first cell with expression 115, and a second cell with expression 117.

If at operation 212 a determination is made that the availability status for the dynamic function indicates the target function called by calculation engine 113 is presently available to handle evaluation of an associated expression, then dynamic function service 121 responsively routes or dispatches (213) the function call for handling by the dynamic function. In FIG. 1, dynamic function handler 122 can dispatch function calls made initially by calculation engine 113 for delivery to an appropriate function platform among function sources 130. An evaluated result is responsively received from the appropriate function platform, and this result can be provided (214) to calculation engine 113.

As a specific example, function 141 might be called in expression 115 in workbook 114. This function can be a part of expression 115, along with user data, metadata, parameters 116, or other information that can be provided with the function call. The availability status for function 141 is indicated as available. Thus, dynamic function handler 122 can issue one or more function calls responsive to calculation engine 113 issuing one or more function calls that employ function 141. Dynamic function handler 122 can issue these one or more function calls to any of function platforms 132, such as a selected function platform that provides for evaluation of function 141.

In some examples, the functions comprise multi-step functions, recursive functions, or nested functions, among others. These functions might require more than one execution step or function call to complete and determine a result. In these cases, asynchronous function handler 123 can handle evaluation of the functions by issuing a series of function calls out to the appropriate function platform. Each intermediate result received from the function platform can be cached or otherwise stored by asynchronous function handler. These intermediate results can be employed in further function calls to produce a final evaluated result based on the intermediate results and one or more repeated function calls. A further discussion on these multi-step function calls is discussed below in FIGS. 3 and 4.

If at operation 212 a determination is made that the availability status for the dynamic function indicates the target function called by calculation engine 113 is not presently available to handle evaluation of an associated expression, then dynamic function service 121 responsively (215) responds to the function call for the dynamic function with a predetermined result. The predetermined result can be provided to calculation engine 113 for use as a result in an associated cell, such as in a cell for expression 117 in FIG. 1. The predetermined result can include numerical results, alphanumeric results, error indicators, function status indicators, or other predetermined results that are unrelated to evaluation of the expression associated with the function. Asynchronous function handler 123 can cache the function calls that are directed to unavailable functions for use once those functions become available.

For example, in FIG. 1, function 142 can initially be indicated as unavailable, and evaluation of expression 117 by dynamic function service 121 can return an error message, busy indicator, or error flag that indicates to the user or calculation engine 113 that the result is not presently available. Asynchronous function handler 123 can cache the function call originally issued by calculation engine 113 for later use once function 142 becomes available. In some examples, the function call is not cached, and instead a change in availability status of the function can trigger re-calculation by calculation engine 113 for that function.

Advantageously, the predetermined result can allow calculation engine 113 to continue to evaluate other expressions and process other data or cells, which might include further function calls. In this manner, processing threads that comprise calculation engine 113 are not 'hung up' or stalled while the unavailable function remains unavailable for evaluating expressions. Instead, calculation engine 113 can continue to engage in various other functions, threads, and processes. Moreover, the various dynamic functions can be presented as ready or available to handle calculations independent of the availably status of the dynamic functions. Predetermined results can be presented to calculation engine 113 as if the dynamic functions were available, and once calculated results are available these results can be indicated to calculation engine 113.

Dynamic function handler 122 continues to monitor availability of the unavailable functions. This monitoring can comprise detecting a busy status of the dynamic functions, a connectivity status to a platform that provides the dynamic functions, network connectivity status when dynamic function service 120 experiences connectivity problems, or other monitored statuses. When the dynamic function is detected as available, dynamic function handler 122 can be triggered to issue the function call originally issued by calculation engine 113. As a specific example, function 142 might be called in expression 117 in workbook 114. This function can be a part of expression 117, along with user data, metadata, parameters 118, or other information that can be provided with the function call. If dynamic function 142 was unavailable for a period of time, any function calls by calculation engine 113 for function 142 can return a predetermined result, as indicated above. Once function 142 is detected as being available for processing expressions or other data, then dynamic function handler 122 can issue to function platforms 132 any function calls that reference the now-available dynamic function 142. Results can be provided to calculation engine 113 for use in workbook 114. Once individual results are completed, any associated predetermined message can be replaced with the individual result. Moreover, graphical or textual indicators can be presented in application 111 for a user to be informed of the expression evaluation completion.

Turning now to a discussion on how dynamic functions might be registered with calculation engine 113, a user, operator, developer, or other entity might want to add a function or class of functions to user application 111. To assist with this addition of functions, an interface can be implemented. The interface contains object-oriented programming 'methods' to access information about the functions, such as a function name, description, and arguments. One interface method includes the 'execute' method, which has parameters that comprise an array of operations, a return operation for the computed result, and the count of the number of operations. In some examples, these operations comprise native Microsoft® Excel XLSOPERs. The return type can further include a 'future' return type. This framework can be used to extend to make web requests or out-of-proc calls, which might be IO blocking. Rather than hang a main thread, as other calculation operations do, this framework allows the user to continue using the application and user interface, such as a spreadsheet, and the functions can publish results when ready in an asynchronous manner.

Synchronous execution is also possible in this framework, such as when a user employs expressions that execute non-blocking IO functions or have a complex execution scenarios. In many of the asynchronous examples herein, a quasi-asynchronous form of calculation is performed, as true asynchronous calculation might require further changes to the application and calculation engine. In the quasi-asynchronous examples, a series of synchronous calculation processes are performed, and intermediate results are maintained between each intermediate synchronous calculation. This operation might warrant some restrictions on function and expression types, such as nested functions must be stateless (i.e. (for a set of given arguments, the result must always be the same). Other functions, such as random number generation typically produce a different value every time the function is called. In these cases, an entire cell formula/expression will be executed as volatile. While functions that are internal to the application or calculation engine can be specified as volatile in a predetermined fashion, external functions, such as the dynamic functions discussed herein, can be difficult to discern volatility. Thus, a new method can be included to support the dynamic functions, namely an IsSynchronous( ) method that informs the application or calculation engine to execute the function in a synchronous fashion.

Below is an example interface a client of the framework can implement to support dynamic functions.

```
class IDynamicUdf
{
public:
    virtual Mso : : Async : : Future<XLSOPER*> Execute (
        const XLSOPER * const   *rgpoper , XLSOPER*
```

-continued

```
        poperRes , int coper ) = 0 ;
    virtual bool Is Synchronous ( ) = 0 ;
    virtual long GetUUID ( ) = 0 ;
    virtual XCHAR*GetName ( ) = 0 ;
    virtualXCHAR*GetDescription ( ) = 0 ;
    virtual XCHAR*GetHelpUrl ( ) = 0 ;
    virutal   DynamicUdfParameters GetParameters ( ) = 0 ;
}
```

Where 'parameters' is a struct containing argument information, and
'ArgumentType' is simply an enum of types (e.g. integer, string).

```
struct DynamicUdfParameters
{
    virtual LXHolder<XCHAR> GetNames ( ) ;
    virtual LXHolder<ArgumentType> GetTypes ( ) ;
    virtual LXHolder<XCHAR> GetHelpUrl ( ) ;
} ;
```

The above description is one example interface for adding a new function for use by the application or calculation engine. To actually register the function with the application or calculation engine, such as to register the function for use by a spreadsheet application in cell expression evaluation, a further process can indicate another method to the application, such as the example 'static' method shown below. Modification of an existing registered function can be achieved by removal and registration. Functions can be registered during startup of the application, or at other times. One example 'static' method includes:

static void Register (XLSWORKBOOK*p*wbk,
       IDynamicUDF& modernUDF);
    static void Remove(XLSWORKBOOK*pbk, long uuid);

Returning to the elements of FIG. 1, elements of each of user platform 110 and dynamic function platform 120 can include communication interfaces, network interfaces, processing systems, computer systems, microprocessors, storage systems, storage media, or some other processing devices or software systems, and can be distributed among multiple devices or across multiple geographic locations. Examples of elements of each of user platform 110 and dynamic function platform 120 can include software such as an operating system, applications, logs, interfaces, databases, utilities, drivers, networking software, and other software stored on a computer-readable medium. Elements of each of user platform 110 and dynamic function platform 120 can comprise one or more platforms which are hosted by a distributed computing system or cloud-computing service. Elements of each of user platform 110 and dynamic function platform 120 can comprise logical interface elements, such as software defined interfaces and Application Programming Interfaces (APIs).

Elements of user platform 110 include application 111, user interface 112, and calculation engine 113. In this example, application 111 comprises a spreadsheet application It should be understood that user application 111 can comprise any user application, such as productivity applications, communication applications, social media applications, gaming applications, mobile applications, or other applications. User interface 112 comprises graphical user interface elements that can produce output for display to a user and receive input from a user. User interface 112 can comprise elements discussed below in FIG. 6 for user interface system 608. Calculation engine 113 comprises one or more software elements configured to process expressions for evaluation, call functions included in the expressions, process user data, perform mathematical evaluation of expressions, reference other data elements, such as data cells, and call the dynamic functions discussed herein, among other operations. In some examples, calculation engine 113 comprises elements of Microsoft® Excel calculation engine (e.g. 'calc') which can perform cell calculations and re-calculations, among other operations.

Elements of dynamic function platform 120 include dynamic function service 121 that comprises dynamic function handler 122 and asynchronous function handler 123, among other elements. Dynamic function handler 122 can include one or more user interfaces, such as web interfaces, APIs, terminal interfaces, console interfaces, command-line shell interfaces, extensible markup language (XML) interfaces, among others. Dynamic function handler 122 can dynamically register and interface one or more functions hosted by function sources 130 for use by calculation engine 113. Dynamic function handler 122 comprises communication interfaces to communicate with function sources 130, which can include communication equipment or software that is specialized for particular data services or function platforms. Asynchronous function handler 123 comprises processing elements to handle nested or recursive calls to functions provided by function sources 130. Asynchronous function handler 123 can include cache elements to cache intermediate results and provide these results for further calculation by functions provided by function sources 130.

Function platforms 132 can each comprise application servers, storage servers, web servers, email servers, and can be deployed over distributed or cloud computing platforms which provides data or communication services. Function platforms 132 can store and operate functions or data for use by user applications. In some examples, function platforms 132 comprise machine learning platforms, artificial intelligence systems, or other machine intelligence platforms.

Links 160-161, along with other links not shown among the elements of FIG. 1 for clarity, can each comprise one or more communication links, such as one or more network links comprising wireless or wired network links. The links can comprise various logical, physical, or application programming interfaces. Example communication links can use metal, glass, optical, air, space, or some other material as the transport media. The links can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. The links can be direct links or may include intermediate networks, systems, or devices, and can include a logical network link transported over multiple physical links.

Figure 3:
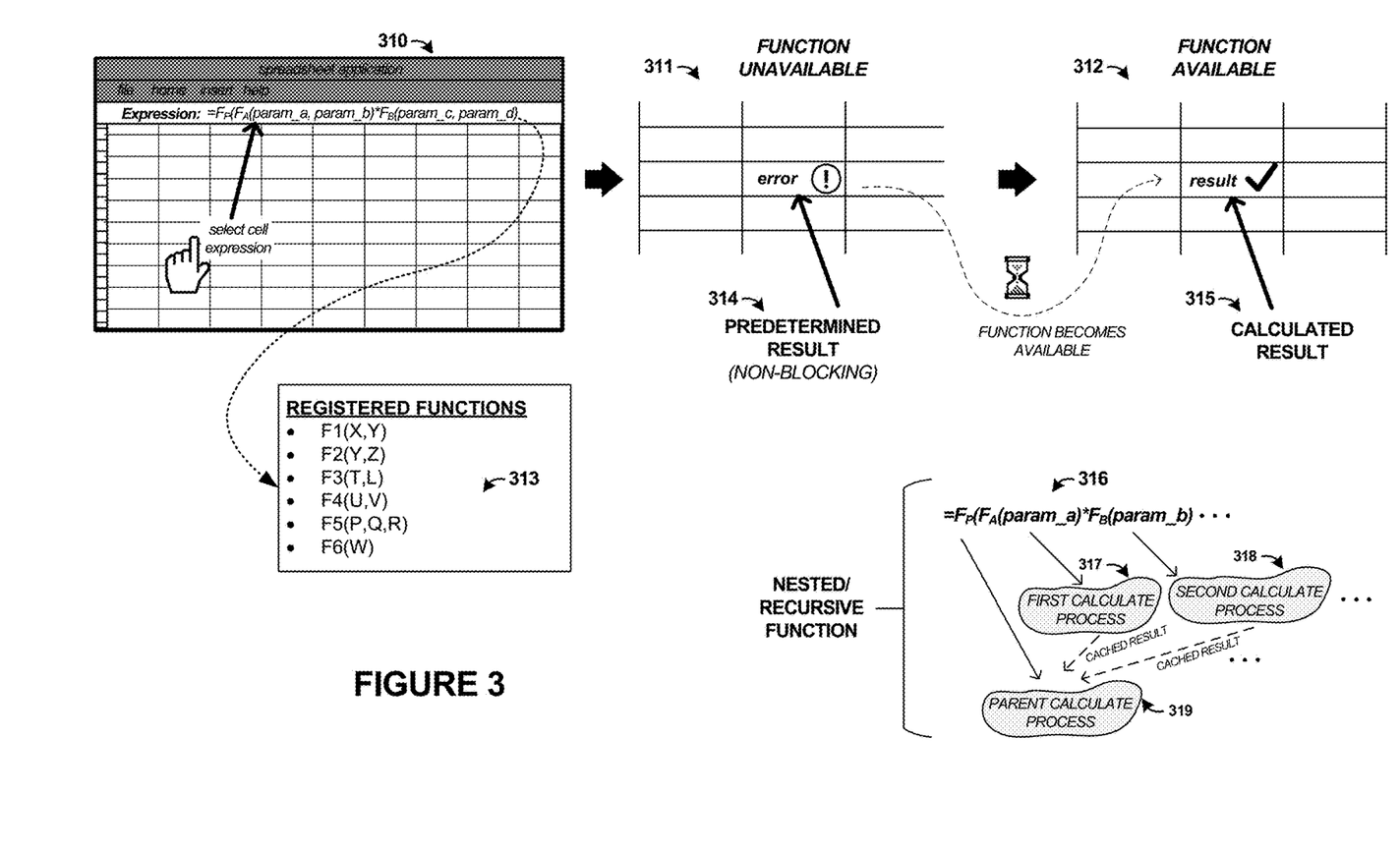
FIG. 3 illustrates a data calculation environment in an example.

As a further example of dynamic function handling frameworks, FIG. 3 is provided. FIG. 3 includes spreadsheet view 310, along with process steps 311-312 for executing expression evaluation using one or more dynamic functions. Nested/recursive function example 316 is also shown to provide further examples for dynamic function handling in an asynchronous manner.

In FIG. 3, view 310 shows a grid of cells that form a workbook in a spreadsheet application, such as that discussed in FIG. 1. A user can enter data or expressions into any of the cells, and these expressions can be employed to evaluate or manipulate data within the expressions or referenced in other cells, among other data. In one example, a user can enter an example expression into a cell that references one or more functions that are available for data evaluation or other activities, such as the expression $\lambda_1(A, B)$ that calls expression '$\lambda_1$' with parameters 'A' and 'B' for evaluation/processing by the function. Although these expressions can include nested or recursive functions, in this first example a non-recursive/nested function will be discussed.

In the context of the elements of FIG. 1, dynamic function service 121 registers one or more functions for use by calculation engine 113. These functions can include registered functions 313 in FIG. 3, with each function having an identifier from which to call the function within a cell as well as one or more parameters that are used to pass data or other content to the function for processing/evaluation. Six registered functions are shown in FIG. 3, and these functions can be employed in any expression in the cells of the spreadsheet or workbook. As with functions 140 in FIG. 1, availability indicators can optionally be associated therewith.

Operation 311 illustrates example functionality when a dynamic function is not presently available for evaluation of an expression, such as when a function registered by dynamic function service 121 is not available. A predetermined message or result is presented as the result from the dynamic function for use in the cell that references the dynamic function. In operation 311, predetermined result 314 is an error message or error flag that indicates the function in not available and the cell does not display a calculated result. Moreover, predetermined result 314 frees up calculation engine 113 and any associated processing threads to work on other expressions or calculating results for other cells of the workbook. Thus, a non-blocking operation is advantageously achieved.

Operation 312 illustrates example operation when a dynamic function that was once unavailable become available for expression evaluation. In operation 312, calculated result 315 is presented to calculation engine 113 for presentation to a user in the associated cell of the workbook. To trigger calculation, predetermined results, and re-calculation of the expressions based on the availably of the dynamic functions, various processes are presented in the examples below.

According to a trigger, such as entry of a formula or expression by a user, loading/startup of the spreadsheet application and/or workbook, or a user selecting a calculation user interface element, calculation engine 113 can attempt to evaluate the formula or expression. Calculation engine 113 can make one or more calls to the functions that are included in the associated cells, and these calls are handled over the interface presented by dynamic function service 121. Dynamic function service 121 presents results back to calculation engine 113 responsive to the calls made by calculation engine 113. Since dynamic function service 121 monitors availability status for the dynamic functions that are potentially called by calculation engine 113, then dynamic function service 121 can provide calculated results or predetermined results, depending upon factors such as the availability of the functions.

In FIG. 3, an example of nested/recursive functions is provided by example operation 316. A nested function includes expressions that have one or more function calls within another function call, such as a parent function calling a child function as a parameter within the parent function. A recursive function includes expressions that are self-referential or call the same function more than one time, with a parent function calling the same function according to an iteration factor/count or other factors. The example shown in FIG. 3 includes two child functions being called as parameters within a parent function, and results from these child functions are multiplied together to provide a parent result. Specifically, child functions 317 and 318 are included as parameters for an expression involving parent function 319. Each child function can also have one or more parameters, such as those shown in example 316, and these parameters can comprise functions as well.

The execution or evaluation of the nested expression shown in example 316 might require many steps and function calls to functions that may or may not be presently available, and dynamic function service 121 can handle these according to asynchronous or quasi-asynchronous operations. During the asynchronous or quasi-asynchronous operation, intermediate results might be cached for later use in further calculations/evaluations, or for presentation to calculation engine 113 once a calculated result is available.

A detailed discussion on one example implementation of calling dynamic functions for evaluation is presented. First, dynamic functions can be registered for use and for referencing by a user application, such as a spreadsheet or other user application. Names or labels for the functions can be defined which are used by the application to call or employ the functions. The labels can be pointers to the functions or objects associated with the functions. One or more flags can be included in the function definitions that indicate that the function is dynamic, and this flag can be used during calls or during dispatch to indicated to the function handler, such as dynamic function service 121, to handle the function accordingly.

During user entry, a function can be referenced by entering a function label or name and typically a parenthetical portion containing one or more parameters, such as Function_name(parameters). Several static functions can include standard mathematical functions with parameters, or built-in default functions. However, the examples herein employ enhanced functions, namely the dynamic functions. To handle the dynamic functions discussed herein, the functions are referenced by pointers that are handled by dynamic function service 121. To add a new dynamic function into the application for use by a user, a new function label is created and a pointer to the dynamic function is added which indicates to dynamic function service 121 which function is referenced.

Many of the examples herein are in the context of a spreadsheet application, such as Microsoft® Excel, among others. Before proceeding, it is useful for a high-level understanding of some spreadsheet components. These include 'parse' and 'evaluation' components. Every non-empty cell in Excel is typically not stored in the human-readable format presented to the user, but rather as a compiled expression. Whenever the expression/formula in a cell is updated, parse is triggered to execute and responsively converts contents of that cell to a compiled expression. Parse does this so evaluation by calculation engine 113 can perform computations on the cells (referred to as the 'calc' or 're-calc' process).

The 'evaluation' component ('eval') can be a stack machine, with operands pushed or popped onto it depending on the operations encountered. The operations could be something like a multiplication (i.e. a binary operator with two operands), which when encountered will pop two operands off the stack and push their computation as a new operand to the stack. Evaluation takes a compiled expression, evaluates the compiled expression, and returns a result to the cell. One cell referencing another cell will push the other cell value (as an evaluated compiled expression) as an operand onto the stack.

One specific example includes cell contents=1*2, and the corresponding compiled expression might be 1e 01 00 1e 02 00 05. Upon an evaluation of this 7 byte, 3 token, compiled expression, an integer (determined by 1e) of value 1 (01 00) is pushed onto the stack. Similarly, the next token (3 bytes) cause another integer of value 2 to be pushed onto the stack. When the last token (byte of value 05) is read, this corresponds to multiplication, and this causes popping of the last 2 values of the stack (since multiplication is a binary operator with two operands), and pushing of a new integer of value 2 (the result of multiplication 1×2).

With this specific multiplication example in mind, a further example can be discussed using dynamic functions. As explained, one example implementation of calculation engine 113 comprises 'calc' or 're-calc' processes that use a stack machine of operands. When an LBL binds to a function the compiled expression consists of an additional token, namely the LBL. So Function_name(1,2) would produce 3 operands: a (pointer to) label "Function_name" and two integers 1, 2. The operation is a variation on a normal function which knows the first operand will contain information regarding function dispatch. More specifically, this operator causes a handler process to be invoked, which knows how do dispatch various function types.

The operands on the stack can comprise primitive data types that are used for internal representation of expressions or portions thereof. These primitive data types can comprise unions of data types such as date, time, number, or other information, with a bit field identifying which type is represented. When a compiled expression comes into evaluation the calc process can decide based at least on the type on what primitive data type to construct to push onto the stack. When we have a pointer for a dynamic function in the compiled expression, the corresponding decision causes us to invoke an associated function name, such as "Function_name" discussed above. It is in this function that the calc process can make another decision to construct a new primitive data type with a bit field indicating a pointer to the dynamic function. In summary, one example implementation to add dynamic function handling into a stack machine-based operation of a calc process includes adding new primitive data types comprising pointers to reference an associated dynamic function, and the primitive data types can include new function types and bit fields to accommodate the dynamic functions.

Figure 4:
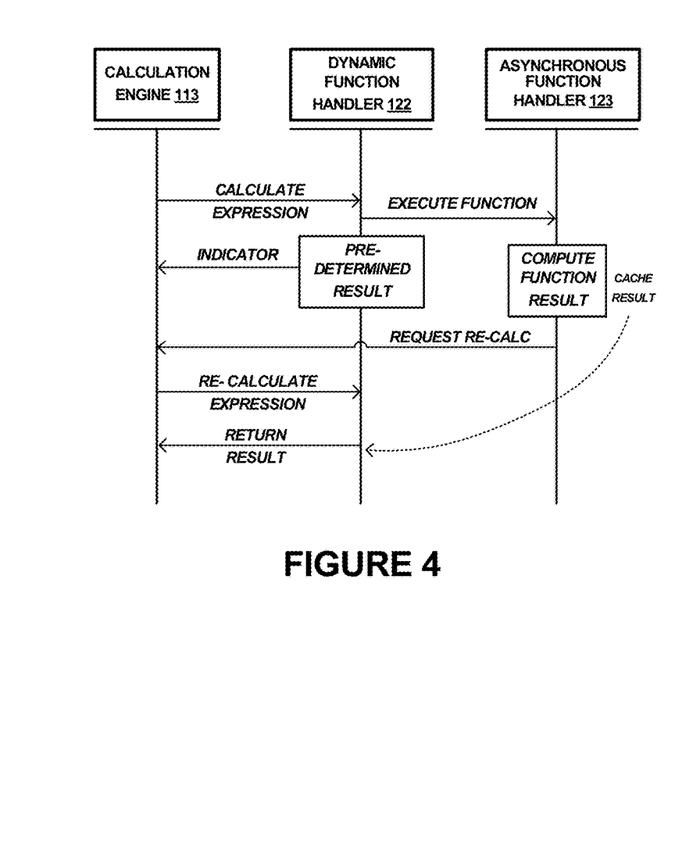
FIG. 4 illustrates operations of data calculation environments in an example.
Figure 5:
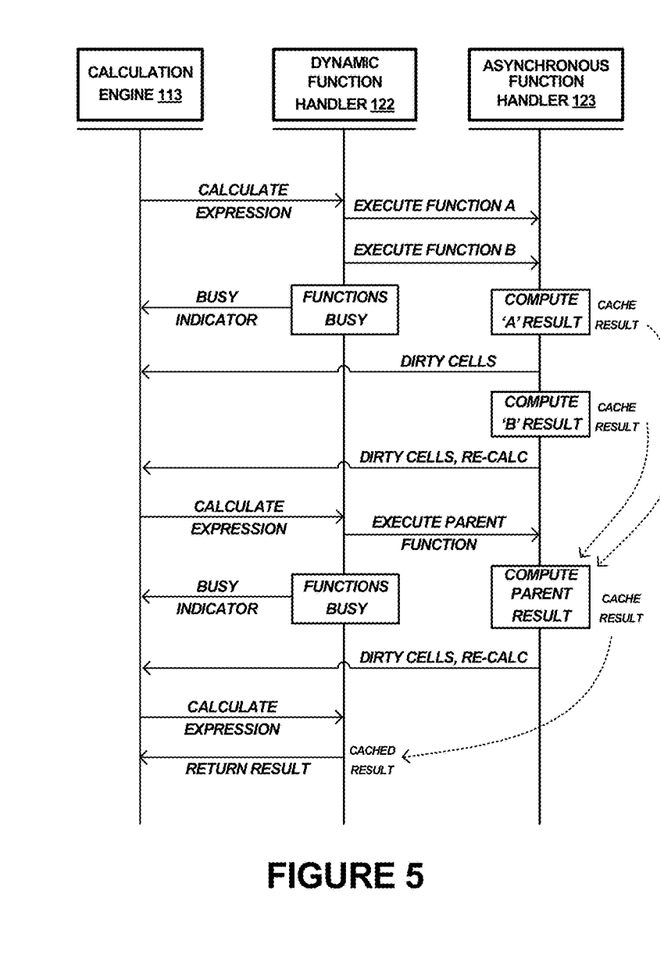
FIG. 5 illustrates operations of data calculation environments in an example.

To further illustrate example implementations of asynchronous handling of dynamic functions, FIGS. 4 and 5 are presented. FIGS. 4 and 5 are diagrams illustrating relative timing during handling of dynamic functions. Some functions might produce a behavior known as IO blocking, where further operation of processing threads that handle the calculation engine or function-handling portions of the application might be hung or 'blocked' when a function is processing and pending results. Examples below in FIGS. 4 and 5 provide for asynchronous operation, such as by initially responding to dynamic function calls with predetermined results and then spawning one or more operations that generate corresponding results that are cached and prompt recalculation processes.

FIG. 4 shows a first example asynchronous function handling process. In FIG. 4, calculation engine 113 can make one or more calls to evaluate or calculate expressions comprising dynamic functions. Calculation engine 113 can reference the dynamic functions using the labels/names indicated above as well as the pointers that reference the dynamic functions in dynamic function handler 122. Responsive to receiving a call for calculating an expression with a dynamic function, dynamic function handler 122 can execute the function using asynchronous function handler 123. Meanwhile, dynamic function handler 122 issues a pre-determined result to calculation engine 113, which might comprise an indicator or message. This indicator can inform calculation engine 113 that a corresponding result is not available, and thus the indicator might comprise an error flag, an unavailability flag, a "getting data" flag, or other indicator. Calculation engine 113 is then free to process other expressions, among other operations, without waiting or hanging on a result from the previously called dynamic function.

To handle the dynamic function, asynchronous function handler 123 communicates with any of the function sources, such as one or more of function platforms 132 that host the dynamic functions. This can comprise asynchronous function handler 123 communicating with APIs or other interfaces of the associated function platform to initiate processing by that function platform. Asynchronous function handler 123 can pass parameters, user data, function information, or other information along with the call for processing by the dynamic function by the function platform.

In some examples, the dynamic function might not be presently available. In these cases, asynchronous function handler 123 might withhold dispatch of the function call for the dynamic function to the proper function platform until the dynamic function is available again. Asynchronous function handler 123 might also cache the function call issued by calculation engine 113 for use once the dynamic function becomes available. However, once the dynamic function is available for calculation, then asynchronous function handler 123 can dispatch one or more calls for processing of the user data or user parameters by the dynamic function.

Once the dynamic function has completed processing or calculation, asynchronous function handler 123 receives the associated result from the appropriate function platform. This result is stored by asynchronous function handler 123 for later return to calculation engine 113. Asynchronous function handler 123 can cache this result in an associated data structure or data storage device. asynchronous function handler 123 then requests recalculation of the expression by calculation engine 113. Responsively, calculation engine 113 issues a re-calculation operation for re-evaluation of the expression. Since the result is already cached by asynchronous function handler 123, the result can be responsively provided to calculation engine 113 without undue delay or any additional processing delay. Once calculation engine 113 receives the cached result, this result can be presented to the user or populated into an associated cell, among other operations by the application.

However, some functions might be nested, might depend upon other functions, or might depend upon itself (recursively). Asynchronous function handler 123 can also handle these situations, and one example is presented in FIG. 5. In these examples, one or more repeated dispatches of for the dynamic functions are performed by asynchronous function handler 123, with intermediate results cached by asynchronous function handler 123. Multiple re-calculation requests might then be issued to fully process the expression by calculation engine 113.

Consider an example cell indexed by column B and row 2 (e.g. cell B2) in a workbook of a spreadsheet that includes formula: $=\lambda_1(\lambda_1(A, B), \lambda_2(C, D)+1)$. There are potentially two separate dynamic functions in this example formula ($\lambda_1$ and $\lambda_2$), each with associated parameters, and one of the functions ($\lambda_1$) is invoked twice. Before the outermost (parent) call of $\lambda_1$ can occur, the 2 inner (child) calls must complete. A calculate expression process is called by calculation engine 113 for a first time, and both $\lambda_1(A,B)$ and $\lambda_2(C,D)$ can be initially called. If these functions happen to be IO blocking, or presently unavailable, then calculation engine 113 might have to wait for completion before continuing with other tasks, threads, or other expressions for other cells. However, in the examples herein, an asynchronous operation is provided by asynchronous function handler 123. Asynchronous function handler 123 can return pre-determined results for the call for the expression in cell B2, and calculation engine 113 can continue to process other items. The pre-determined result in this example is a busy indicator that informs calculation engine 113 to not wait for a result from the expression—which might entail calculation engine 113 moving on to work on another processing thread.

Once the associated dynamic functions $\lambda_1$ and $\lambda_2$ are available to process/calculate expressions with the associated parameters, then asynchronous function handler 123 can dispatch function calls to the appropriate function platforms. Results for each of the functions $\lambda_1$ and $\lambda_2$ can be collected by asynchronous function handler 123 and cached. As intermediate results for the inner functions are received by asynchronous function handler 123, the cells from which the function calls originate can be indicated as invalid, out of date, or 'dirty' and thus might require re-calculation by calculation engine 113. Moreover, once all inner/intermediate results have been collected and calculations completed by asynchronous function handler 123, a recalculation indication can be issued by asynchronous function handler 123.

A data structure, such as a table, can be employed by asynchronous function handler 123 to track intermediate results and completion status. For example upon initial call by calculation engine 113 for the inner functions, asynchronous function handler 123 can track status as follows:

| Cell | Function | Arguments | Result |
| --- | --- | --- | --- |
| B2 | $\lambda_1$ | (A, B) | $\perp$ |
| B2 | $\lambda_2$ | (C, D) | $\perp$ |

This table indicates that the results of the two function calls are still yet to be completed (as indicate by the $\perp$ symbol). When $\lambda_1$ completes the table is updated with the result of $\lambda_1$ with arguments (A, B). After updating the table, asynchronous function handler 123 checks if all results for the target cell (B2) are resolved, which in this case they are not, and so asynchronous function handler 123 waits for further results. When $\lambda_2$ completes, the table is updated with the results of $\lambda_2$ with arguments (C,D). Again, after updating the table, asynchronous function handler 123 checks to see if all results for cell B2 have been received, and now they have been. Responsively, asynchronous function handler 123 issues a recalculation indication to calculation engine 113.

Calculation engine 113 then issues a calculation call again for the expression indicated in cell B2, which is indicated by formula "$=\lambda_1(\lambda_1(A, B), \lambda_2(C, D)+1)$." Asynchronous function handler 123 checks to see if any results are cached for this formula/expression, and according to the table indicated above there are intermediate results cached for the inner expressions. Dispatches by asynchronous function handler 123 for the inner functions are no longer needed, due to results having been cached. Thus, a function call for the parent/outer function $\lambda_1(X, Y)$ can be dispatched using the previously cached intermediated results from the child/inner functions $\lambda_1$, $\lambda_2$ indicated by 'X' and 'Y' respectively. The table indicated above can be updated for the parent function, so that asynchronous function handler 123 can track when results are available. Specifically, the table can be updated as follows:

| Cell | Function | Arguments | Result |
| --- | --- | --- | --- |
| B2 | $\lambda_1$ | (A, B) | X |
| B2 | $\lambda_2$ | (C, D) | Y |
| B2 | $\lambda_1$ | (X, Y) | $\perp$ |

As with the initial dispatching of the inner functions, if the parent function happens to be IO blocking, or presently unavailable, then calculation engine 113 might have to wait for completion before continuing with other tasks or expressions. However, in the examples herein, an asynchronous operation is provided by asynchronous function handler 123. Asynchronous function handler 123 can return pre-determined results for the expression call for cell B2, and calculation engine 113 can continue to process other items, threads, or expressions in other cells. The pre-determined result in this example can be a further busy indicator that informs calculation engine 113 to not wait for a result from the expression—which might entail calculation engine 113 moving to work on another processing thread.

When results are received for the parent function upon completion of that function by the associated function platform, the table can be updated by asynchronous function handler 123 as follows:

| Cell | Function | Arguments | Result |
| --- | --- | --- | --- |
| B2 | $\lambda_1$ | (A, B) | X |
| B2 | $\lambda_2$ | (C, D) | Y |
| B2 | $\lambda_1$ | (X, Y) | Z |

Again, after updating the table, asynchronous function handler 123 checks to see if all results for cell B2 have been received, and now they have been. Responsively, asynchronous function handler 123 issues a recalculation indication to calculation engine 113. Calculation engine 113 then issues a calculation call again for the expression indicated in cell B2, which is indicated by formula "$=\lambda_1(\lambda_1(A, B), \lambda_2(C, D)+1)$." Asynchronous function handler 123 checks to see if any results are cached for this formula/expression, and according to the table indicated above there are intermediate and final results cached for the inner and outer expressions. A final calculated result can be indicated by asynchronous function handler 123 to calculation engine 113 for presentation to the user in cell B2. After presenting the final calculated result, asynchronous function handler 123 can clear out any table related to evaluation of cell B2.

Additional handling features for asynchronous calculation and evaluation includes changes to the cells and the positioning of the cells in the interim during intermediate calculations. For example, a user can modify the grid for which the target cell is a member, such as inserting a row above the current cell that is presently performing an asynchronous calculation. Changes to cell positioning can prompt new calculation processes. Old intermediate results from an incomplete calculation can remain in the table until the new calculation is finished.

Notice the table indicated above maps a cell to ((λ, args) Result). Therefore, there are effectively two maps in the table, one indicating the cell and another indicating the function-argument pair. In the example function above, there were three possible invocations, because the result of $\lambda_1(A, B)$ may be the same as value A, and the result of $\lambda_2(C,D)$ may be the same as value B. In which case, as our functions are stateless, there is no need to perform another computation for $\lambda_1$, as we already have the result for $\lambda_1(A,B)$. Thus, in this example, the maximum number of times a calculation needs to be called is the depth of the function.

Asynchronous re-calculation is not appropriate for all functions and calculations. For example, if the target cell includes volatile functions, such as random number generation, or depends upon an intermediate volatile function then then the calculation process might run synchronously instead of asynchronously. Volatile behavior can be detected by determining if the function name indicates a volatile function, or by using a flag or other indicator that signals a volatile function.

Turning now to further features of dynamic function service 120, a function auto-complete process can be implemented. The function auto-complete can be provided within cells or other portions of the user application. When a user beings typing the name of a function, the user can be presented with a listing of available dynamic functions that align with the already-typed content. However, dynamic function service 120 can ensure that the list of available dynamic function is current, such as when new functions have been registered or de-registration of dynamic functions. Various triggers or events can be established that refreshes the list of the dynamic functions, such as during idle times of the application, or responsive to function registration, among other events.

Figure 6:
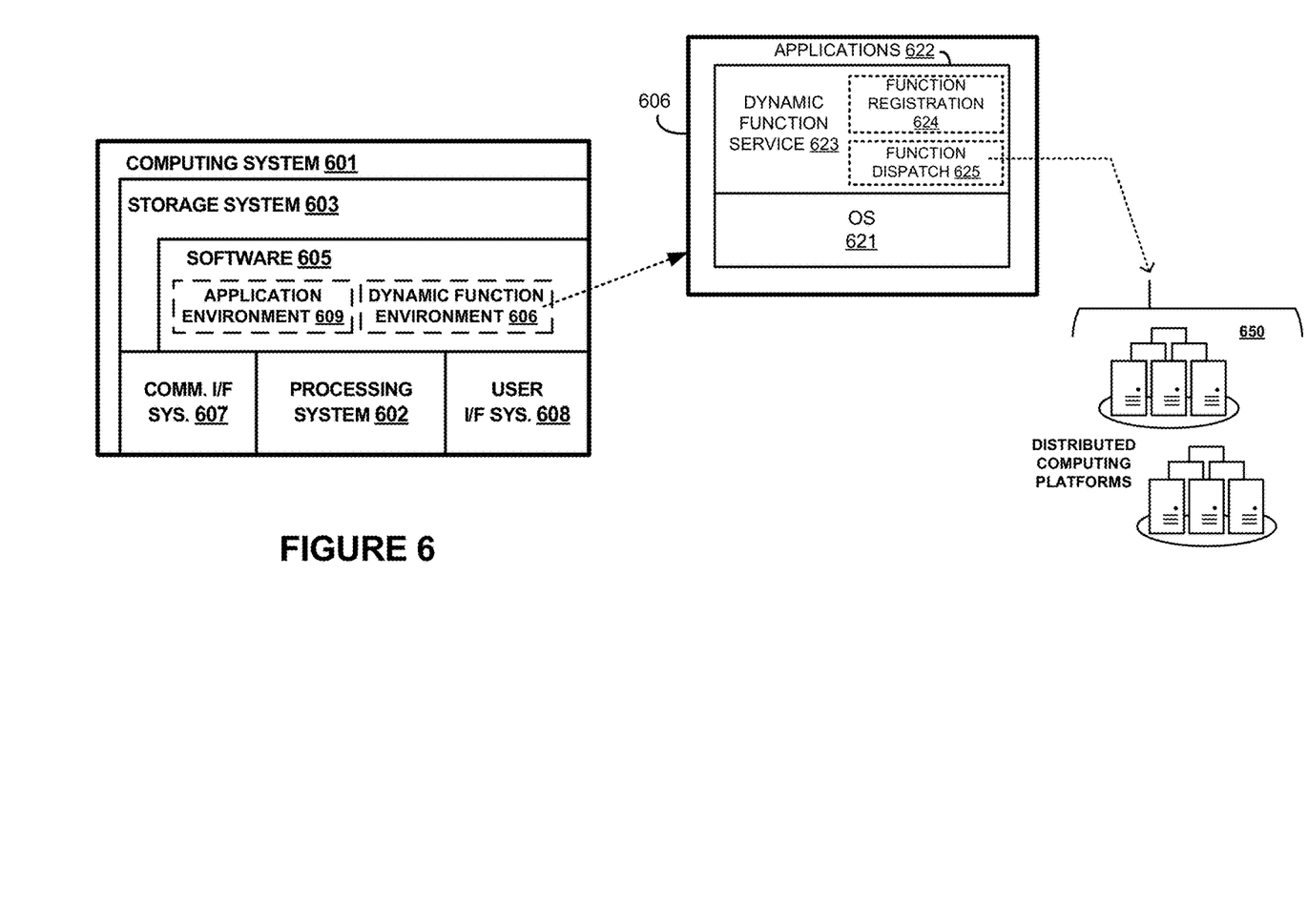
FIG. 6 illustrates a computing system suitable for implementing any of the architectures, processes, and operational scenarios disclosed herein.

Turning now to FIG. 6, computing system 601 is presented. Computing system 601 that is representative of any system or collection of systems in which the various operational architectures, scenarios, and processes disclosed herein may be implemented. For example, computing system 601 can be used to implement any of user platform 110 or dynamic function platform 120 of FIG. 1. Examples of computing system 601 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 601 are implemented on user devices, example devices include smartphones, laptop computers, tablet computers, desktop computers, gaming systems, entertainment systems, and the like.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 608. Processing system 602 is operatively coupled with storage system 603, communication interface system 607, and user interface system 608.

Processing system 602 loads and executes software 605 from storage system 603. Software 605 includes dynamic function environment 606 and/or application environment 609, which is representative of the processes discussed with respect to the preceding Figures. When executed by processing system 602 to enhance data calculation frameworks and calculation engines, software 605 directs processing system 602 to operate as described herein for at least the various processes, operational scenarios, and environments discussed in the foregoing implementations. Computing system 601 may optionally include additional devices, features, or functionality not discussed for purposes of brevity.

Referring still to FIG. 6, processing system 602 may comprise a microprocessor and processing circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, resistive memory, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing the data calculation frameworks and dynamic function platforms discussed herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software or other application software, in addition to or that include dynamic function environment 606 or application environment 609. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced data calculation frameworks and dynamic function platforms. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Dynamic function environment 606 or application environment 609 each includes one or more software elements, such as OS 621 and applications 622. These elements can describe various portions of computing system 601 with which users, calculation engines, applications, dynamic function services, or other elements, interact. For example, OS 621 can provide a software platform on which application 622 is executed and allows for processing expressions and data with one or more dynamic functions, and dynamically handling functions, among other functions.

In one example, dynamic function service 623 includes function registration 624 and function dispatch 625. Function registration 624 dynamically registers one or more functions for use by a calculation engine, and monitors availability status for the functions. Function registration 624 also can indicate availability status to a calculation engine, and indicate predetermined results responsive to function calls to the dynamic functions. Function dispatch 625 handles dispatching of function calls to one or more dynamically-provided functions that can be provided by one or more external platforms, such as distributed computing platforms 650 in FIG. 6. Function dispatch 625 can cache results or temporary results, handle asynchronous or quasi-asynchronous dispatching of function calls, and handle nested or recursive function calls for functions registered for use by function registration 624.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. Physical or logical elements of communication interface system 607 can receive datasets from telemetry sources, transfer datasets and control information between one or more distributed data storage elements, and interface with a user to receive data selections and provide visualized datasets, among other features.

User interface system 608 is optional and may include a keyboard, a mouse, a voice input device, a touch input device for receiving input from a user. Output devices such as a display, speakers, web interfaces, terminal interfaces, and other types of output devices may also be included in user interface system 608. User interface system 608 can provide output and receive input over a network interface, such as communication interface system 607. In network examples, user interface system 608 might packetize display or graphics data for remote display by a display system or computing system coupled over one or more network interfaces. Physical or logical elements of user interface system 608 can receive user input from users or other operators, and provide outputs of processed expressions and functions, or other information to users or other operators. User interface system 608 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method of providing a data calculation framework for a user application, the method comprising providing one or more functions for use by a calculation engine of the user application, and determining that the calculation engine issues a call for evaluation of a nested expression comprising at least a child function embedded in a parent function, and responsively dispatching at least a first evaluation process for a first portion of the nested expression that employs the child function. During evaluation of the nested expression, the method includes indicating to the calculation engine a predetermined result for at least the parent function, and responsive to availability of a child result from the first evaluation process, dispatching at least a second evaluation process for a second portion of the nested expression that employs the child result. Responsive to receiving a parent result from the second evaluation process, the method includes indicating the parent result to the calculation engine.

Example 2

The method of Example 1, where the predetermined result comprises an indication of unavailability of at least the parent function.

Example 3

The method of Examples 1-2, where the predetermined result does not block the calculation engine from processing other expressions in the user application.

Example 4

The method of Examples 1-3, further comprising dispatching at least the first evaluation process by at least routing a call for the child function to a first service that hosts the child function and issuing the predetermined result for the parent function to the calculation engine during processing of the call for the child function by the first service. Responsive to receiving a result for the call to the child function from the first service that hosts the child function, the method includes issuing a recalculation request to the calculation engine for at least the parent function.

Example 5

The method of Examples 1-4, further comprising caching the child result responsive to receiving the child result from the first evaluation process.

Example 6

The method of Examples 1-5, further comprising responsive to a recalculation process issued by the calculation engine for the parent function, dispatching at least the second evaluation process with the child result to a second service that hosts the parent function and maintaining the predetermined result for the parent function to the calculation engine. Once the parent result is available from the second service, the method includes issuing a further recalculation request to the calculation engine for the parent function, and providing the parent result responsive to a further recalculation process issued by the calculation engine for the parent function.

Example 7

The method of Examples 1-6, where the nested expression comprises a recursive function that employs at least the parent function calling the child function, and where the child function comprises the parent function.

Example 8

The method of Examples 1-7, further comprising responsive to receiving the child result from the first evaluation process, indicating to the calculation engine the predetermined result for the child function as inaccurate to prompt issuance of a recalculation process by the calculation engine for the parent function. Responsive to issuance of the recalculation process by the calculation engine, the method includes dispatching at least the second evaluation process for the second portion of the nested expression that employs the child result cached from the first evaluation process.

Example 9

A function evaluation framework for a user application, comprising one or more computer readable storage media a processing system operatively coupled with the one or more computer readable storage media, and program instructions stored on the one or more computer readable storage media. Based on being read and executed by the processing system, the program instructions direct the processing system to at least provide one or more functions for use by a calculation engine of the user application, and determine that the calculation engine issues a call for evaluation of a nested expression comprising at least a child function embedded in a parent function, and responsively dispatch at least a first evaluation process for a first portion of the nested expression that employs the child function. During evaluation of the nested expression, the program instructions direct the processing system to indicate to the calculation engine a predetermined result for at least the parent function. Responsive to availability of a child result from the first evaluation process, the program instructions direct the processing system to dispatch at least a second evaluation process for a second portion of the nested expression that employs the child result. Responsive to receiving a parent result from the second evaluation process, the program instructions direct the processing system to indicate the parent result to the calculation engine.

Example 10

The function evaluation framework of Example 9, where the predetermined result comprises an indication of unavailability of at least the parent function.

Example 11

The function evaluation framework of Examples 9-10, where the predetermined result does not block the calculation engine from processing other expressions in the user application.

Example 12

The function evaluation framework of Examples 9-11, comprising further program instructions, based on being executed by the processing system, direct the processing system to at least dispatch at least the first evaluation process by at least routing a call for the child function to a first service that hosts the child function and issuing the predetermined result for the parent function to the calculation engine during processing of the call for the child function by the first service, and responsive to receiving a result for the call to the child function from the first service that hosts the child function, issue a recalculation request to the calculation engine for at least the parent function.

Example 13

The function evaluation framework of Examples 9-12, comprising further program instructions, based on being executed by the processing system, direct the processing system to at least cache the child result responsive to receiving the child result from the first evaluation process.

Example 14

The function evaluation framework of Examples 9-13, comprising further program instructions, based on being executed by the processing system, direct the processing system to at least, responsive to a recalculation process issued by the calculation engine for the parent function, dispatch at least the second evaluation process with the child result to a second service that hosts the parent function and maintain the predetermined result for the parent function to the calculation engine, and once the parent result is available from the second service, issue a further recalculation request to the calculation engine for the parent function, and provide the parent result responsive to a further recalculation process issued by the calculation engine for the parent function.

Example 15

The function evaluation framework of Examples 9-14, where the nested expression comprises a recursive function that employs at least the parent function calling the child function, and where the child function comprises the parent function.

Example 16

The function evaluation framework of Examples 9-15, comprising further program instructions, based on being executed by the processing system, direct the processing system to at least, responsive to receiving the child result from the first evaluation process, indicate to the calculation engine the predetermined result for the child function as inaccurate to prompt issuance of a recalculation process by the calculation engine for the parent function. Responsive to issuance of the recalculation process by the calculation engine, the further program instructions direct the processing system to dispatch at least the second evaluation process for the second portion of the nested expression that employs the child result cached from the first evaluation process.

Example 17

A method of providing a function handling service to a spreadsheet application that comprises cells containing one or more data evaluation expressions, the method comprising receiving a request from a calculation service of the spreadsheet application for evaluation of a nested expression in a cell that comprises a top-level function calling one or more inner functions, and responsively returning a predetermined result to the calculation service and dispatching an evaluation process for the one or more inner functions. After completion of the evaluation process for the one or more inner functions, the method includes caching results returned for the one or more inner functions and indicating a recalculation request to the calculation service for the cell. The method includes receiving a recalculation request issued by the calculation service for the top-level function, and responsively performing an evaluation process for the top-level function using cached results for the one or more inner functions. After completion of the evaluation process for the top-level function, the method includes caching a result returned for the top-level function and indicating a further recalculation request to the calculation service for the cell. The method also includes receiving a further recalculation request issued by the calculation service for the top-level function, and responsively returning to the calculation service a cached result for the top-level function.

Example 18

The method of Example 17, where the nested expression comprises a recursive function that employs at least the top-level function calling at least one instance of the one or more inner functions, and where the top-level function comprises the one or more inner functions.

Example 19

The method of Examples 17-18, further comprising registering one or more dynamic functions comprising the top-level function and the one or more inner functions for use by the calculation service by at least establishing a dynamic function handler that references locations of the dynamic functions hosted on one or more distributed computing services.

Example 20

The method of Examples 17-19, where the dynamic function handler registers the dynamic functions for use by the calculation service in expression evaluation regardless of availability status of the dynamic functions hosted on the one or more distributed computing services.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of providing a data calculation framework for a user application, the method comprising:
   providing one or more functions for use by a calculation engine of the user application;
   monitoring an availability status of each of the one or more functions, wherein the availability status is related to a present capability of one of each of the one or more functions to process expressions associated with the calculation engine;

determining that the calculation engine issues a call for evaluation of a nested expression comprising at least a child function embedded in a parent function, and responsively dispatching at least a first evaluation process for a first portion of the nested expression that employs the child function;

determining, during the monitoring, that the parent function has an unavailable status;

during evaluation of the nested expression, indicating to the calculation engine, based on the unavailable status of the parent function, a predetermined result for at least the parent function;

determining, during the monitoring based on availability of a child result from the first evaluation process, that the parent function has an available status;

responsive to the available status of the parent function, dispatching at least a second evaluation process for a second portion of the nested expression that employs the child result; and responsive to receiving a parent result from the second evaluation process, indicating the parent result to the calculation engine.

2. The method of claim 1, wherein the predetermined result comprises an indication of unavailability of at least the parent function.

3. The method of claim 1, wherein the predetermined result does not block the calculation engine from processing other expressions in the user application.

4. The method of claim 1, further comprising:
dispatching at least the first evaluation process by at least routing a call for the child function to a first service that hosts the child function and issuing the predetermined result for the parent function to the calculation engine during processing of the call for the child function by the first service; and
responsive to receiving a result for the call to the child function from the first service that hosts the child function, issuing a recalculation request to the calculation engine for at least the parent function.

5. The method of claim 4, further comprising:
caching the child result responsive to receiving the child result from the first evaluation process.

6. The method of claim 4, further comprising:
responsive to a recalculation process issued by the calculation engine for the parent function, dispatching at least the second evaluation process with the child result to a second service that hosts the parent function and maintaining the predetermined result for the parent function to the calculation engine; and
once the parent result is available from the second service, issuing a further recalculation request to the calculation engine for the parent function, and providing the parent result responsive to a further recalculation process issued by the calculation engine for the parent function.

7. The method of claim 1, wherein the nested expression comprises a recursive function that employs at least the parent function calling the child function, and wherein the child function comprises the parent function.

8. A function evaluation framework for a user application, comprising:
one or more computer readable storage media;
a processing system operatively coupled with the one or more computer readable storage media; and
program instructions stored on the one or more computer readable storage media that, based on being read and executed by the processing system, direct the processing system to at least:
provide one or more functions for use by a calculation engine of the user application;
monitor an availability status of each of the one or more functions, wherein the availability status is related to a present capability of each of the one or more functions to process expressions associated with the calculation engine;
determine that the calculation engine issues a call for evaluation of a nested expression comprising at least a child function embedded in a parent function, and responsively dispatch at least a first evaluation process for a first portion of the nested expression that employs the child function;
determine, during the monitoring, that the parent function has an unavailable status;
during evaluation of the nested expression, indicate to the calculation engine, based on the unavailable status of the parent function, a predetermined result for at least the parent function;
determining, during the monitoring based on availability of a child result from the first evaluation process, that the parent function has an available status;
responsive to the available status of the parent function, dispatch at least a second evaluation process for a second portion of the nested expression that employs the child result; and
responsive to receiving a parent result from the second evaluation process, indicate the parent result to the calculation engine.

9. The function evaluation framework of claim 8, wherein the predetermined result comprises an indication of unavailability of at least the parent function.

10. The function evaluation framework of claim 8, wherein the predetermined result does not block the calculation engine from processing other expressions in the user application.

11. The function evaluation framework of claim 8, comprising further program instructions, based on being executed by the processing system, direct the processing system to at least:
dispatch at least the first evaluation process by at least routing a call for the child function to a first service that hosts the child function and issuing the predetermined result for the parent function to the calculation engine during processing of the call for the child function by the first service; and
responsive to receiving a result for the call to the child function from the first service that hosts the child function, issue a recalculation request to the calculation engine for at least the parent function.

12. The function evaluation framework of claim 11, comprising further program instructions, based on being executed by the processing system, direct the processing system to at least:
cache the child result responsive to receiving the child result from the first evaluation process.

13. The function evaluation framework of claim 11, comprising further program instructions, based on being executed by the processing system, direct the processing system to at least:
responsive to a recalculation process issued by the calculation engine for the parent function, dispatch at least the second evaluation process with the child result to a second service that hosts the parent function and maintain the predetermined result for the parent function to the calculation engine; and once the parent result is available from the second service, issue a further recalculation request to the calculation engine for the parent function, and provide the parent result responsive to a further recalculation process issued by the calculation engine for the parent function.

14. The function evaluation framework of claim 8, wherein the nested expression comprises a recursive function that employs at least the parent function calling the child function, and wherein the child function comprises the parent function.

15. A method of providing a function handling service to a spreadsheet application that comprises cells containing one or more data evaluation expressions, the method comprising:

receiving a request from a calculation service of the spreadsheet application for evaluation of a nested expression in a cell that comprises a top-level function calling one or more inner functions;

monitoring an availability status of the top-level function and the one or more inner functions, wherein the availability status is related to a present capability of each of the monitored functions to process expressions associated with the calculation service;

determining, during the monitoring, that the top-level function has an unavailable status and responsively returning, based on the unavailable status of the top-level function, a predetermined result to the calculation service and dispatching an evaluation process for the one or more inner functions;

after completion of the evaluation process for the one or more inner functions, caching results returned for the one or more inner functions and indicating a recalculation request to the calculation service for the cell;

receiving a recalculation request issued by the calculation service for the top-level function, and responsively performing an evaluation process for the top-level function using cached results for the one or more inner functions;

after completion of the evaluation process for the top-level function, caching a result returned for the top-level function and indicating a further recalculation request to the calculation service for the cell; and receiving a further recalculation request issued by the calculation service for the top-level function, and responsively returning to the calculation service a cached result for the top-level function.

16. The method of claim 15, wherein the nested expression comprises a recursive function that employs at least the top-level function calling at least one instance of the one or more inner functions, and wherein the top-level function comprises the one or more inner functions.

17. The method of claim 15, further comprising:

registering one or more dynamic functions comprising the top-level function and the one or more inner functions for use by the calculation service by at least establishing a dynamic function handler that references locations of the dynamic functions hosted on one or more distributed computing services.

18. The method of claim 17, wherein the dynamic function handler registers the dynamic functions for use by the calculation service in expression evaluation regardless of availability status of the dynamic functions hosted on the one or more distributed computing services.

\* \* \* \* \*